US010044492B2

(12) United States Patent
Liu et al.

(10) Patent No.: US 10,044,492 B2
(45) Date of Patent: Aug. 7, 2018

(54) ANTENNA AND COMMUNICATIONS DEVICE

(71) Applicant: HUAWEI TECHNOLOGIES CO., LTD., Shenzhen (CN)

(72) Inventors: Yu Liu, Chengdu (CN); Huaping Qing, Chengdu (CN); Kun Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 15/083,985

(22) Filed: Mar. 29, 2016

(65) Prior Publication Data

US 2016/0211963 A1 Jul. 21, 2016

Related U.S. Application Data

(63) Continuation of application No. PCT/CN2013/084792, filed on Sep. 30, 2013.

(51) Int. Cl.
*H04L 5/14* (2006.01)
*H01Q 1/52* (2006.01)
(Continued)

(52) U.S. Cl.
CPC ........... *H04L 5/1461* (2013.01); *H01Q 1/525* (2013.01); *H01Q 21/06* (2013.01); *H01Q 21/28* (2013.01);
(Continued)

(58) Field of Classification Search
CPC ........ H01Q 1/525; H01Q 1/521; H01Q 21/06; H01Q 21/28; H04B 7/0837; H04B 1/525; H04B 1/54; H04B 7/06
(Continued)

(56) References Cited

U.S. PATENT DOCUMENTS 6,049,307 A  4/2000 Lim
2009/0061789 A1  3/2009 Howard et al.
(Continued)

FOREIGN PATENT DOCUMENTS

CN  201303345  9/2009
CN  101938291  1/2011
(Continued)

OTHER PUBLICATIONS

International Search Report, dated Jul. 1, 2014, in corresponding International Application No. PCT/CN2013/084792 (11 pp.).
(Continued)

*Primary Examiner* — Robert J Pascal
*Assistant Examiner* — Jorge Salazar, Jr.
(74) *Attorney, Agent, or Firm* — Staas & Halsey, LLP

(57) ABSTRACT

Embodiments of the present invention provide an antenna and a communications device, and relate to the field of wireless communications technologies. The antenna includes at least one receive antenna unit, at least one transmit antenna unit, a transmit and receive antenna unit connected to a three-port component having a circulator characteristic, a signal output port, and a signal input port, where each receive antenna unit and a receiver port of the three-port component are both connected to the signal output port by using a power combiner, and the signal output port is configured to connect to a receiver; and each transmit antenna unit and a transmitter port of the three-port component are both connected to the signal input port by using a power divider, and the signal input port is configured to connect to a transmitter.

10 Claims, 5 Drawing Sheets

(51) Int. Cl.
*H04B 7/08* (2006.01)
*H01Q 21/06* (2006.01)
*H01Q 21/28* (2006.01)
*H04B 7/06* (2006.01)
*H04B 1/525* (2015.01)
*H04B 1/54* (2006.01)

(52) U.S. Cl.
CPC ........... *H04B 7/0837* (2013.01); *H04B 1/525* (2013.01); *H04B 1/54* (2013.01); *H04B 7/06* (2013.01)

(58) Field of Classification Search
USPC .................... 333/100, 132; 455/278.1, 279.1
See application file for complete search history.

(56) References Cited

U.S. PATENT DOCUMENTS

| | | | |
|---|---|---|---|
| 2011/0063170 A1* | 3/2011 | Ookawa | H01Q 1/3233 342/372 |
| 2013/0155913 A1 | 6/2013 | Sarca | |
| 2013/0162475 A1 | 6/2013 | Blech et al. | |

FOREIGN PATENT DOCUMENTS

| | | |
|---|---|---|
| CN | 102111177 | 6/2011 |
| CN | 103248594 | 8/2013 |
| JP | 2010156708 | 7/2010 |
| WO | WO2013/120087 | 8/2013 |

OTHER PUBLICATIONS

Extended European Search Report, dated Jul. 28, 2016, in corresponding European Application No. 13894097.8 (8 pp.).
Lee, S.W. et al., *Design and Development of an Integrated Twin Feed Horn for a DBS Reflector Antenna*, IEEE Transactions on Antennas and Propagation, vol. 54, No. 8, Aug. 2006, pp. 2414-2416.
Jain, M. et al., *Practical, Real-time, Full Duplex Wireless*, MobiCom '11, Sep. 19-23, 2011, Las Vegas, Nevada, USA (12 pp.).
International Search Report dated Jul. 1, 2014, in corresponding International Application No. PCT/CN2013/084792.

* cited by examiner

ANTENNA AND COMMUNICATIONS DEVICE

CROSS-REFERENCE TO RELATED APPLICATIONS

This application is a continuation of International Application No. PCT/CN2013/084792, filed on Sep. 30, 2013, which is hereby incorporated by reference in its entirety.

TECHNICAL FIELD

The present invention relates to the field of wireless communications technologies, and in particular, to an antenna and a communications device.

BACKGROUND

A co-frequency full-duplex technology refers to a communication manner in which when a communications device performs wireless communication, transmitting and receiving are performed simultaneously, and signal transmitting and signal receiving use a same spectrum resource. Compared with a communication manner of time division duplex, in the communication manner of co-frequency full-duplex, signal sending and receiving can be performed simultaneously. Compared with a communication manner of frequency division duplex, in the communication manner of co-frequency full-duplex, signal sending and receiving can be performed by using a same spectrum resource. Therefore, in a same spectrum resource condition, a transmission speed of the co-frequency full-duplex technology is twice higher than a transmission speed of the time division duplex technology and a transmission speed of the frequency division duplex technology.

When a communications device performs co-frequency full-duplex communication, a transmitter of the communications device causes co-channel interference to a receiver. In the prior art, the communications device performing co-frequency full-duplex communication is generally disposed with a circulator. The circulator includes three ports, which may be defined as an antenna port, a receiver port, and a transmitter port, where the antenna port, the receiver port, and the transmitter port are connected to a transmit and receive antenna, the receiver, and the transmitter respectively. The circulator can increase isolation between the transmitter and the receiver, and decreases interference from the transmitter to the receiver.

In a process of implementing the present invention, the inventor finds that the prior art has at least the following problems:

In the foregoing structure in which the circulator is used, co-channel interference is caused due to mismatch of the antenna port of the circulator, and some of signals transmitted by the transmitter by using an antenna are reflected back to the circulator by the antenna and enter the receiver, which causes that interference from a transmit signal to a receive signal is relatively high.

SUMMARY

In order to decrease interference from a transmit signal to a receive signal, embodiments of the present invention provide an antenna and a communications device. The technical solutions are as follows:

According to one aspect, an antenna is provided, where the antenna includes at least one receive antenna unit, at least one transmit antenna unit, a transmit and receive antenna unit connected to a three-port component having a circulator characteristic, a signal output port, and a signal input port, where each receive antenna unit and a receiver port of the three-port component are both connected to the signal output port by using a power combiner, and the signal output port is configured to connect to a receiver; and each transmit antenna unit and a transmitter port of the three-port component are both connected to the signal input port by using a power divider, and the signal input port is configured to connect to a transmitter.

In a first possible implementation manner of the first aspect, a connection line set including a connection line between a phase center of each transmit antenna unit and a phase center of each receive antenna unit and a connection line between a phase center of the transmit and receive antenna unit and a phase center of each of other antenna units, and a power allocation value of an interference source antenna unit that is in antenna units at two ends of each connection line in the connection line set and causes co-channel interference to an antenna unit at the other end satisfy the following condition:

there is at least one manner for dividing the connection line set into subsets, where all connection lines in the connection line set are divided into at least one pair of subsets, and in two subsets of each pair of subsets, a length difference between any two connection lines between the subsets is equal to an odd multiple of half of an operating wavelength of the antenna, a length difference between any two connection lines in a subset with more than one connection line is equal to an integer multiple of the operating wavelength of the antenna, and a sum of square roots of power allocation values of interference source antenna units corresponding to all connection lines in one subset is equal to a sum of square roots of power allocation values of interference source antenna units corresponding to all connection lines in the other subset.

In a second possible implementation manner of the first aspect, in a receive antenna unit and a transmit antenna unit whose phase centers are away from a phase center of the transmit and receive antenna unit by a distance smaller than a preset distance, a connection line set including a connection line between a phase center of each transmit antenna unit and a phase center of each receive antenna unit and a connection line between the phase center of the transmit and receive antenna unit and a phase center of each of other antenna units, and a power allocation value of an interference source antenna unit that is in antenna units at two ends of each connection line in the connection line set and causes co-channel interference to an antenna unit at the other end satisfy the following condition:

there is at least one manner for dividing the connection line set into subsets, where all connection lines in the connection line set are divided into at least one pair of subsets, and in two subsets of each pair of subsets, a length difference between any two connection lines between the subsets is equal to an odd multiple of half of an operating wavelength of the antenna, a length difference between any two connection lines in a subset with more than one connection line is equal to an integer multiple of the operating wavelength of the antenna, and a sum of square roots of power allocation values of interference source antenna units corresponding to all connection lines in one subset is equal to a sum of square roots of power allocation values of interference source antenna units corresponding to all connection lines in the other subset.

With reference to the first possible implementation manner and the second possible implementation manner of the first aspect, in a third possible implementation manner of the first aspect, a quantity of connection lines in each subset in the connection line set is 1; and power allocation values of all antenna units connected to the power divider are equal.

In a fourth possible implementation manner of the first aspect, the at least one receive antenna unit is specifically two receive antenna units, and the at least one transmit antenna unit is specifically two transmit antenna units;

respective phase centers of the two receive antenna units are symmetric with respect to a phase center of the transmit and receive antenna unit; and respective phase centers of the two transmit antenna units are symmetric with respect to the phase center of the transmit and receive antenna unit.

With reference to the fourth possible implementation manner of the first aspect, in a fifth possible implementation manner of the first aspect, distances between the phase centers of both of the receive antenna units and the phase centers of both of the transmit antenna units are equal.

With reference to the fifth possible implementation manner of the first aspect, in a sixth possible implementation manner of the first aspect, a distance between the phase center of the transmit and receive antenna unit and the phase center of each receive antenna unit and a distance between the phase center of the transmit and receive antenna unit and the phase center of each transmit antenna unit are equal.

With reference to the fourth possible implementation manner of the first aspect, in a seventh possible implementation manner of the first aspect, the antenna further includes multiple receive auxiliary antenna units and multiple transmit auxiliary antenna units, where phase centers of the receive auxiliary antenna units are located on an extended line of a connection line between the respective phase centers of the two receive antenna units, and each two of the phase centers of the receive auxiliary antenna units are symmetric with respect to the phase center of the transmit and receive antenna unit; and the receive auxiliary antenna units are all connected to the signal output port by using the power combiner; and phase centers of the transmit auxiliary antenna units are located on an extended line of a connection line between the respective phase centers of the two transmit antenna units, and each two of the phase centers of the transmit auxiliary antenna units are symmetric with respect to the phase center of the transmit and receive antenna unit; and the transmit auxiliary antenna units are all connected to the signal input port by using the power divider.

In an eighth possible implementation manner of the first aspect, the three-port component is a circulator.

In a ninth possible implementation manner of the first aspect, the receive antenna unit is an array including a single feed or multiple feeds, the transmit antenna unit is an array including a single feed or multiple feeds, and the transmit and receive antenna unit is an array including a single feed or multiple feeds.

With reference to the ninth possible implementation manner of the first aspect, in a tenth possible implementation manner of the first aspect, the antenna is further disposed with a reflective surface; and a phase center of a receive antenna unit array including all receive antenna units and the transmit and receive antenna unit coincides with a phase center of a transmit antenna unit array including all transmit antenna units and the transmit and receive antenna unit, and coincides with a focus of the reflective surface.

According to another aspect, a communications device is provided, where the communications device includes a receiver, a transmitter, and the antenna described above, where a signal output port of the antenna is connected to the receiver; and a signal input port of the antenna is connected to the transmitter.

Beneficial effects of the technical solutions provided in the embodiments of the present invention are as follows:

In the embodiments of the present invention, an antenna includes at least one receive antenna unit, at least one transmit antenna unit, a transmit and receive antenna unit connected to a three-port component having a circulator characteristic, a signal output port, and a signal input port, where each receive antenna unit and a receiver port of the three-port component are both connected to the signal output port by using a power combiner, and the signal output port is configured to connect to a receiver; and each transmit antenna unit and a transmitter port of the three-port component are both connected to the signal input port by using a power divider, and the signal input port is configured to connect to a transmitter. In this way, by adjusting a distance between antenna units, different interferences from multiple transmit signals to multiple receive signals can be cancelled each other out in the power combiner, thereby decreasing interference from a transmit signal in a communications device to a receive signal in the communications device.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Embodiment 1

Figure 1:
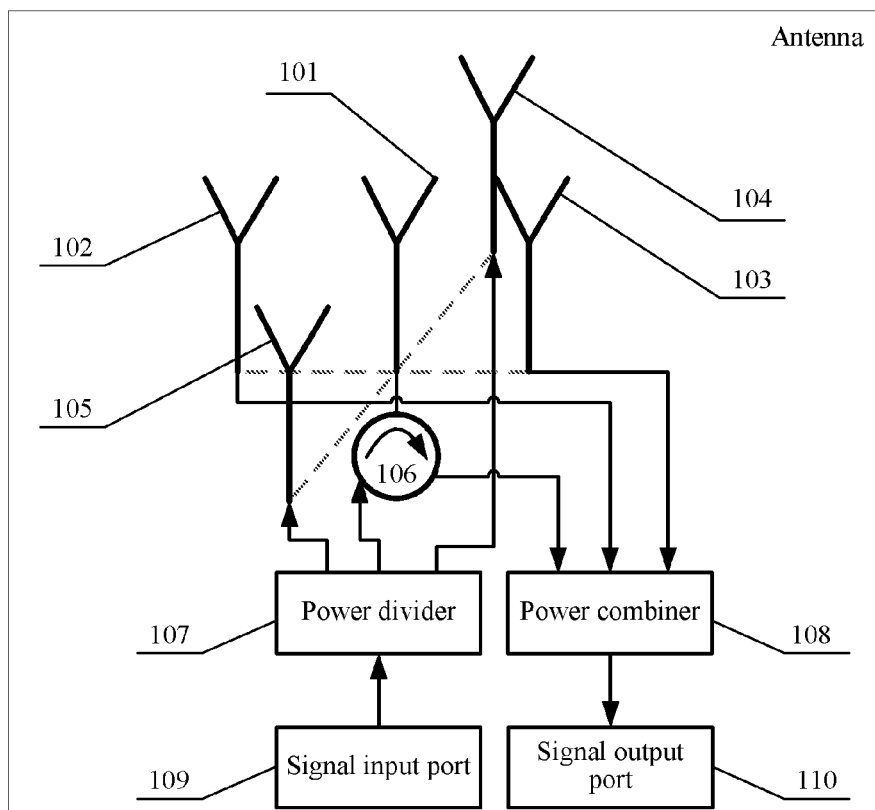
FIG. 1 is a schematic structural diagram of an antenna according to an embodiment of the present invention.

This embodiment of the present invention provides an antenna. As shown in FIG. 1, the antenna includes at least one receive antenna unit (in the figure, two receive antenna units are used as an example, which are a first receive antenna unit 102 and a second receive antenna unit 103), at least one transmit antenna unit (in the figure, two transmit antenna units are used as an example, which are a first transmit antenna unit 104 and a second transmit antenna unit 105), a transmit and receive antenna unit 101 connected to a three-port component 106 having a circulator characteristic, a signal output port 110, and a signal input port 109, where each receive antenna unit and a receiver port of the three-port component 106 are both connected to the signal output port 110 by using a power combiner 108, and the signal output port 110 is configured to connect to a receiver 113 (shown in FIG. 6); and each transmit antenna unit and a transmitter port of the three-port component 106 are both connected to the signal input port 109 by using a power divider 107, and the signal input port 109 is configured to connect to a transmitter 114 (shown in FIG. 6).

In this embodiment of the present invention, an antenna includes at least one receive antenna unit, at least one transmit antenna unit, a transmit and receive antenna unit connected to a three-port component having a circulator characteristic, a signal output port, and a signal input port, where each receive antenna unit and a receiver port of the three-port component are both connected to the signal output port by using a power combiner, and the signal output port is configured to connect to a receiver; and each transmit antenna unit and a transmitter port of the three-port component are both connected to the signal input port by using a power divider, and the signal input port is configured to connect to a transmitter. In this way, by adjusting a distance between antenna units, different interferences from multiple transmit signals to multiple receive signals can be cancelled each other out in the power combiner, thereby decreasing interference from a transmit signal in a communications device to a receive signal in the communications device.

Embodiment 2

This embodiment of the present invention provides an antenna. The antenna shown in FIG. 1 is described in detail in combination with a specific implementation manner in the following. The antenna includes at least one receive antenna unit, at least one transmit antenna unit, a transmit and receive antenna unit 101 connected to a three-port component 106 having a circulator characteristic, a signal output port 110, and a signal input port 109, where each receive antenna unit and a receiver port of the three-port component 106 are both connected to the signal output port 110 by using a power combiner 108, and the signal output port 110 is configured to connect to a receiver 113; and each transmit antenna unit and a transmitter port of the three-port component 106 are both connected to the signal input port 109 by using a power divider 107, and the signal input port 109 is configured to connect to a transmitter 114.

The receiver port of the three-port component 106 is a port configured to transmit a signal received by the transmit and receive antenna unit 101 to the receiver 113, and the transmitter port of the three-port component 106 is a port configured to receive a signal sent by the transmitter 114. The three-port component 106 further includes an antenna port connected to the transmit and receive antenna unit 101. The three-port component 106 having a circulator characteristic has a function of transmitter-receiver isolation and has a signal direction. Inside the three-port component 106, a signal can only be unidirectionally transmitted in the signal direction. The signal direction may be a clockwise direction or a counter-clockwise direction. The receiver port may be a next port of the antenna port in the signal direction, and the antenna port may be a next port of the transmitter port in the signal direction. The three-port component 106 may be preferably a circulator. The signal input port 109 is a port configured to feed a transmit signal from outside of the antenna into the antenna, and may be a transmission line (such as a microstrip), a waveguide, or a component including transmission transition (such as microstrip-to-waveguide transition); or if allowed by connection, may be an input port of the power divider. The signal output port 110 is a port configured to transmit a receive signal from the antenna to a port of an external component, and may be a transmission line (such as a microstrip), a waveguide, or a component including transmission transition (such as microstrip-to-waveguide transition); or if allowed by connection, may be an output port of the power combiner.

The receive antenna unit may be an array including a single feed or multiple feeds, the transmit antenna unit also may be an array including a single feed or multiple feeds, and the transmit and receive antenna unit 101 also may be an array including a single feed or multiple feeds.

Transmit signals of the transmitter 114 may be assigned according to a predetermined ratio by using the power divider 107 to each transmit antenna unit and the transmit and receive antenna unit 101 for transmitting. Signals received by each receive antenna unit and the transmit and receive antenna unit 101 may be combined by using the power combiner 108 and then transmitted to the receiver 113.

Preferably, the antenna may be further disposed with a reflective surface. Moreover, a phase center of a receive antenna unit array including all receive antenna units and the transmit and receive antenna unit 101 coincides with a phase center of a transmit antenna unit array including all transmit antenna units and the transmit and receive antenna unit 101, and coincides with a focus of the reflective surface.

The reflective surface may be a parabolic reflective surface, or may be a reflective surface of another shape. All the receive antenna units and the transmit and receive antenna unit 101 may form the receive antenna unit array, and all the transmit antenna units and the transmit and receive antenna unit 101 may form the transmit antenna unit array. The phase center of the receive antenna unit array, the phase center of the transmit antenna unit array, and the focus of the reflective surface may be set to coincide with each other. In this way, the antenna may be applied to point to point communications; in addition, with this antenna structure, a distance between the antenna units in the receive antenna unit array is adjustable within a large range, and a distance between the antenna units in the transmit antenna unit array is adjustable within a large range. Therefore, a side lobe can be effectively reduced by means of distance adjustment.

Preferably, a location of each antenna unit and a power allocation relationship between each transmit antenna unit and the transmit and receive antenna unit 101 may be set in the following manners:

Manner 1: A connection line set including a connection line between a phase center of each transmit antenna unit and a phase center of each receive antenna unit and a connection line between a phase center of the transmit and receive antenna unit 101 and a phase center of each of other antenna units, and a power allocation value of an interference source antenna unit that is in antenna units at two ends of each connection line in the connection line set and causes co-channel interference to an antenna unit at the other end satisfy the following condition:

there is at least one manner for dividing the connection line set into subsets, where all connection lines in the connection line set are divided into at least one pair of subsets, and in two subsets of each pair of subsets, a length difference between any two connection lines between the subsets is equal to an odd multiple of half of an operating wavelength of the antenna, a length difference between any two connection lines in a subset with more than one connection line is equal to an integer multiple of the operating wavelength of the antenna, and a sum of square roots of power allocation values of interference source antenna units corresponding to all connection lines in one subset is equal to a sum of square roots of power allocation values of interference source antenna units corresponding to all connection lines in the other subset.

A phase center of an antenna unit is an equivalent center at which the antenna unit transmits and receives a signal. Two ends of each connection line in the connection line set correspond to one antenna unit for signal transmitting (may be a transmit antenna unit or the transmit and receive antenna unit 101) and one antenna unit for signal receiving (may be a receive antenna unit or the transmit and receive antenna unit 101). A transmit signal of the antenna unit for signal transmitting may cause interference to a receive signal of the antenna unit for signal receiving. If two ends of a connection line are a receive antenna unit and a transmit antenna unit, or the transmit and receive antenna unit 101 and a transmit antenna unit, an interference source antenna unit thereof may be the transmit antenna unit. If two ends of a connection line are the transmit and receive antenna unit 101 and a receive antenna unit, an interference source antenna unit thereof may be the transmit and receive antenna unit 101. In this way, each connection line may correspond to one interference source antenna unit, one interfered antenna unit, and one interfering signal.

In Manner 1, for the foregoing subsets, a subset may include one or more connection lines. In a subset with more than one connection line, a length difference between any two connection lines is equal to an integer multiple of the operating wavelength of the antenna; in this way, a phase difference between interfering signals corresponding to any two connection lines in the subset is $360°\cdot n$, (n=0, 1, 2, . . . ). In two subsets of each pair of subsets that is obtained after the division, a length difference between any two connection lines between the subsets is equal to an odd multiple of half of the operating wavelength of the antenna; in this way, a phase difference between interfering signals corresponding to any two connection lines between the subsets in each pair of subsets is $180°\cdot(2n+1)$, (n=0, 1, 2, . . . ). In addition, in each pair of subsets, a sum of square roots of power allocation values of interference source antenna units corresponding to all connection lines in one subset is equal to a sum of square roots of power allocation values of interference source antenna units corresponding to all connection lines in the other subset, that is, an amplitude sum of interfering signals corresponding to all connection lines in one subset is equal to an amplitude sum of interfering signals corresponding to all connection lines in the other subset. In this way, for each pair of subsets described above, interfering signals corresponding to connection lines in a subset may be superimposed with each other, an amplitude of an interfering signal obtained by means of superimposition in one subset is equal to an amplitude of an interfering signal obtained by means of superimposition in the other subset, and the interfering signals can be cancelled each other out.

After the foregoing interference cancellation, co-channel interference in the antenna is only port mismatch interference caused at the antenna port of the three-port component 106. After power allocation, because transmit signal power of the transmit and receive antenna unit 101 is only some of entire transmit signal power of the antenna, a ratio of port mismatch interference strength to transmit signal strength is significantly decreased. Therefore, according to this embodiment of the present invention, interference from a transmit signal of the antenna to a receive signal of the antenna can be decreased.

In Manner 1, co-channel interference at a frequency location corresponding to the operating wavelength of the antenna can be decreased, and co-channel interference of a frequency band near the frequency location can be decreased to some extent.

Manner 2: In a receive antenna unit and a transmit antenna unit whose phase centers are away from a phase center of the transmit and receive antenna unit 101 by a distance smaller than a preset distance, a connection line set including a connection line between a phase center of each transmit antenna unit and a phase center of each receive antenna unit and a connection line between the phase center of the transmit and receive antenna unit 101 and a phase center of each of other antenna units; and a power allocation value of an interference source antenna unit that is in antenna units at two ends of each connection line in the connection line set and causes co-channel interference to an antenna unit at the other end satisfy the following condition:

there is at least one manner for dividing the connection line set into subsets, where all connection lines in the connection line set are divided into at least one pair of subsets, and in two subsets of each pair of subsets, a length difference between any two connection lines between the subsets is equal to an odd multiple of half of an operating wavelength of the antenna, a length difference between any two connection lines in a subset with more than one connection line is equal to an integer multiple of the operating wavelength of the antenna, and a sum of square roots of power allocation values of interference source antenna units corresponding to all connection lines in one subset is equal to a sum of square roots of power allocation values of interference source antenna units corresponding to all connection lines in the other subset.

The condition in Manner 2 is similar to that in Manner 1, and a difference lies in that, only locations of antenna units whose phase centers are away from the phase center of the transmit and receive antenna by a distance less than a value and a power allocation relationship between each transmit antenna unit in these antenna units and the transmit and receive antenna unit 101 need to be set, and an antenna unit far away from the phase center of the transmit and receive antenna unit 101 may be ignored.

In the foregoing Manner 1 and Manner 2, preferably, it may be set that a quantity of connection lines in each subset in the connection line set is 1 and power allocation values of all antenna units connected to the power divider 107 are equal.

With this setting, interfering signals corresponding to the connection lines in the connection line set can be pairwise cancelled. The power divider 107 performs equal-proportion allocation.

In this embodiment of the present invention, as shown in FIG. 1, preferably, in the antenna structure, the foregoing at least one receive antenna unit may be specifically two receive antenna units, and the foregoing at least one transmit antenna unit may be specifically two transmit antenna units; moreover, respective phase centers of the two receive antenna units are symmetric with respect to the phase center of the transmit and receive antenna unit 101, and respective phase centers of the two transmit antenna units are symmetric with respect to the phase center of the transmit and receive antenna unit 101. In addition, the power divider 107 may be set to perform equal-proportion allocation, so that transmit signal power of each transmit antenna unit and transmit signal power of the transmit and receive antenna unit 101 are equal.

Figure 2:
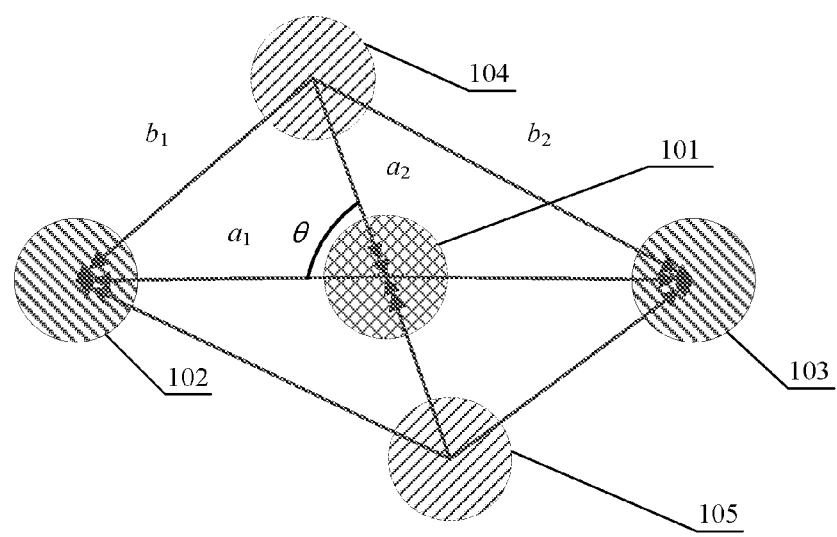
FIG. 2 is a diagram of a location relationship among phase centers of antenna units in an antenna according to an embodiment of the present invention.

A location relationship among the phase centers of the two receive antenna units, the phase centers of the two transmit antenna units, and the phase center of the transmit and receive antenna unit 101 may be as shown in FIG. 2. The phase centers of the two receive antenna units and the phase center of the transmit and receive antenna unit 101 are on a same straight line, and the phase centers of the two transmit antenna units and the phase center of the transmit and receive antenna unit 101 are on a same straight line, and θ in the figure is an angle between the two straight lines. The two receive antenna units and the transmit and receive antenna unit 101 form a receive antenna unit array, and the two transmit antenna units and the transmit and receive antenna unit 101 form a transmit antenna unit array. This antenna structure can effectively reduce a side lobe.

As shown in the figure, path lengths of interfering signals from the first transmit antenna unit 104 to the first receive antenna unit 102, the second receive antenna unit 103, and the transmit and receive antenna unit 101 are $b_1$, $b_2$, and $a_2$ respectively; path lengths of interfering signals from the second transmit antenna unit 105 to the first receive antenna unit 102, the second receive antenna unit 103, and the transmit antenna unit 101 are $b_2$, $b_1$, and $a_2$ respectively; and path lengths of interfering signals from the transmit and receive antenna unit 101 to the first receive antenna unit 102 and the second receive antenna unit 103 are $a_1$.

In order to pairwise cancel the foregoing interfering signals, it may be set that a difference between two path lengths of $a_1$, $a_2$, $b_1$, and $b_2$ is an odd multiple of half of the operating wavelength of the antenna and a difference between the other two path lengths is also an odd multiple of half of the operating wavelength of the antenna; in this way, a phase difference between corresponding interfering signals is 180°·(2n+1), (n=0, 1, 2, . . . ), and the corresponding interfering signals can be cancelled each other out, which is, for example, as shown in the following formula:

$$a_2 = a_1 + (2m+1)\frac{\lambda}{2},\ b_2 = b_1 + (2n+1)\frac{\lambda}{2},$$
$$m = 0, 1, 2, \ldots,\ n = 0, 1, 2, \ldots.$$

In addition, the following formula may be obtained according to a geometrical relationship:

$$\begin{cases} b_1^2 = a_1^2 + a_2^2 - 2a_1 a_2 \cos(\theta) \\ b_2^2 = a_1^2 + a_2^2 - 2a_1 a_2 \cos(\pi - \theta) \end{cases}.$$

With the foregoing two formulas, the following may be obtained:

$$\cos^2(\theta) = \frac{\delta_1^2(4a_1^2 + (a_1+\delta_2)^2 - \delta_1^2)}{16 a_1^2 (a_1+\delta_2)^2},\ 0 < \theta < 90°$$
$$\text{where } \delta_1 = (2n+1)\frac{\lambda}{2},\ \delta_2 = (2m+1)\frac{\lambda}{2},$$
$$n = 0, 1, 2, \ldots,\ m = 0, 1, 2, \ldots.$$

In this way, $a_1$, $a_2$, $b_1$, $b_2$, and θ that satisfy the foregoing relationship may be obtained.

Figure 3:
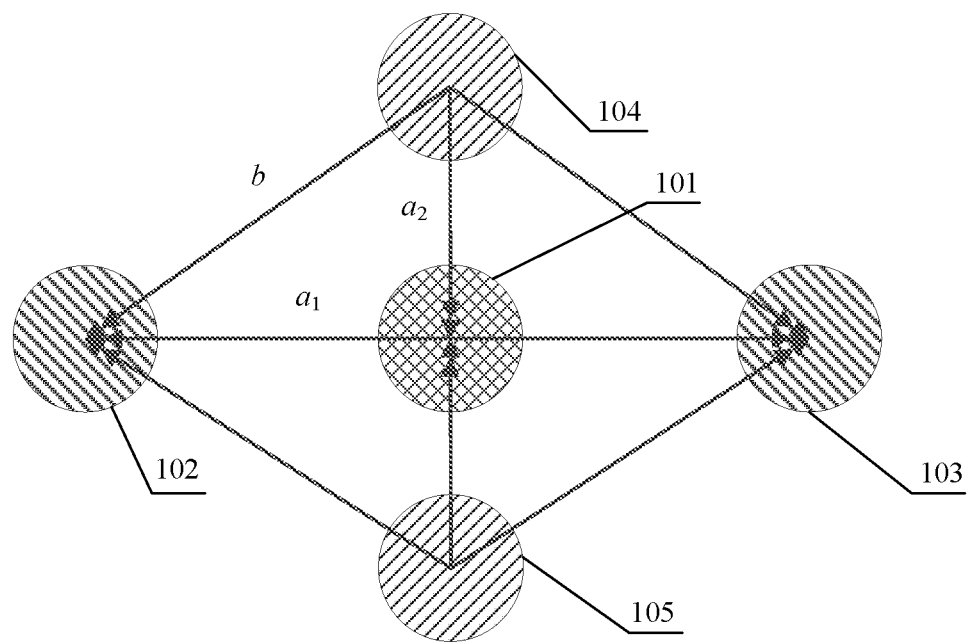
FIG. 3 is a diagram of a location relationship among phase centers of antenna units in an antenna according to an embodiment of the present invention.

Preferably, as shown in FIG. 3, it may be set that distances between the phase centers of the receive antenna units and the phase centers of the transmit antenna units are equal. It is equivalent to that θ shown in FIG. 2 is equal to 90°. As shown in FIG. 3, path lengths of interfering signals from the first transmit antenna unit 104 to the first receive antenna unit 102, the second receive antenna unit 103, and the transmit and receive antenna unit 101 are b, b, and $a_2$ respectively; path lengths of interfering signals from the second transmit antenna unit 105 to the first receive antenna unit 102, the second receive antenna unit 103, and the transmit antenna unit 101 are b, b, and $a_2$ respectively; and path lengths of interfering signals from the transmit and receive antenna unit 101 to the first receive antenna unit 102 and the second receive antenna unit 103 are $a_1$.

In order to pairwise cancel the foregoing interfering signals, it may be set that a difference between $a_1$ and b is an odd multiple of half of the operating wavelength of the antenna and a difference between $a_2$ and b is also an odd multiple of half of the operating wavelength of the antenna; in this way, a phase difference between corresponding interfering signals is 180°·(2n+1), (n=0, 1, 2, . . . ), and the corresponding interfering signals can be cancelled each other out. Corresponding relational expressions may be as follows:

$$b = a_1 + \frac{2n+1}{2}\lambda,\ n = 0, 1, 2, \ldots \text{ and}$$
$$b = a_2 + \frac{2m+1}{2}\lambda,\ m = 0, 1, 2, \ldots.$$

In addition, according to a geometrical relationship, $b = \sqrt{a_1^2 + a_2^2}$ may be obtained, and the following result may be obtained:

$$b = \sqrt{\left(b - \frac{2n+1}{2}\lambda\right)^2 + \left(b - \frac{2m+1}{2}\lambda\right)^2}.$$

In this way, $a_1$, $a_2$, and $b_1$ that satisfy the foregoing relationship may be obtained.

Further, it may be set that a distance between the phase center of the transmit and receive antenna unit 101 and the phase center of each receive antenna unit and a difference between the phase center of the transmit and receive antenna unit 101 and the phase center of each transmit antenna unit are equal. It is equivalent to $a_1 = a_2 = a$ shown in FIG. 3. In addition, m=n may be further set, and then:

$$b = \sqrt{2}\,a = a + \frac{2n+1}{2}\lambda,\ n = 0, 1, 2, \ldots.$$

Therefore, the following may be obtained:

$$a = (\sqrt{2}+1)(2n+1)\frac{\lambda}{2},\ n = 0, 1, 2, \ldots \text{ and}$$
$$b = \sqrt{2}\,(\sqrt{2}+1)(2n+1)\frac{\lambda}{2},\ n = 0, 1, 2, \ldots.$$

In this way, the location relationship between the antenna units may be set.

Figure 4:
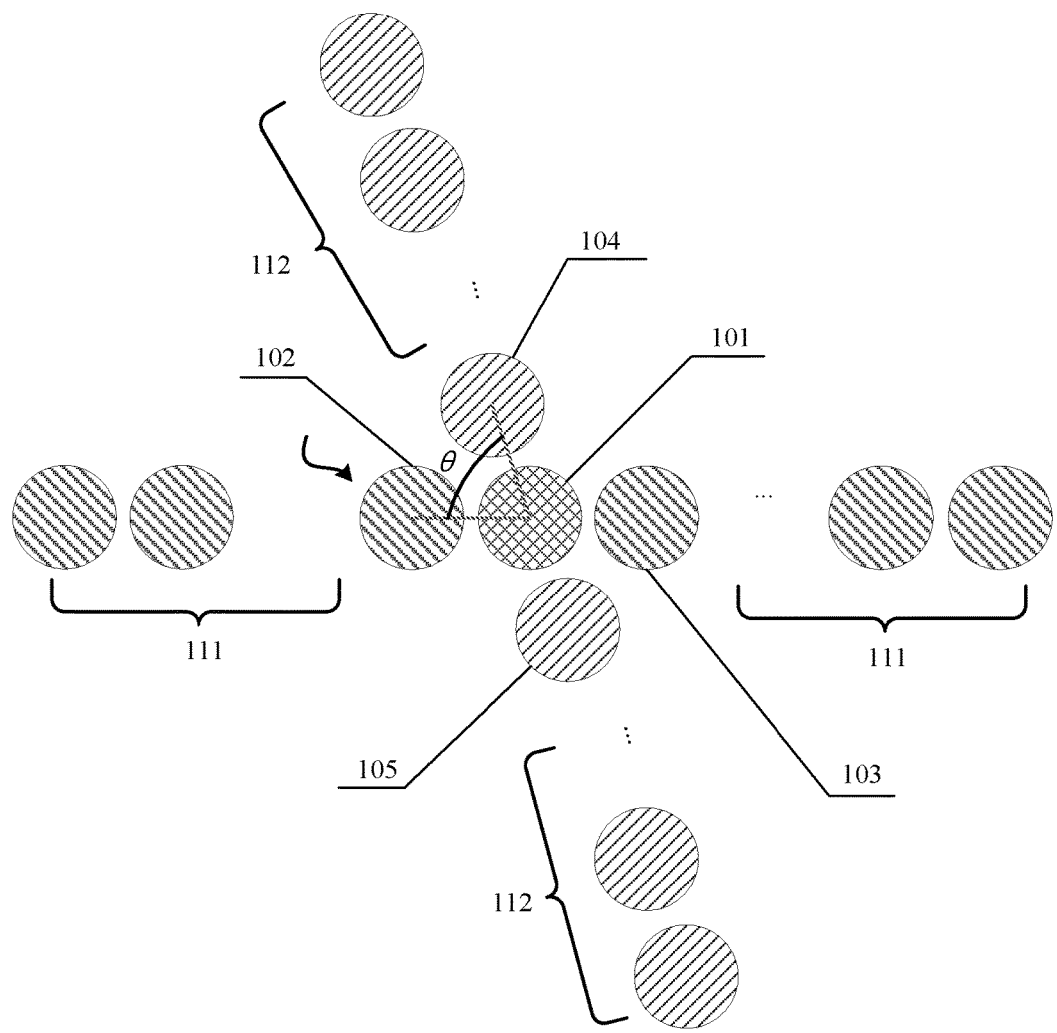
FIG. 4 is a diagram of a location relationship among phase centers of antenna units in an antenna according to an embodiment of the present invention.
Figure 5:
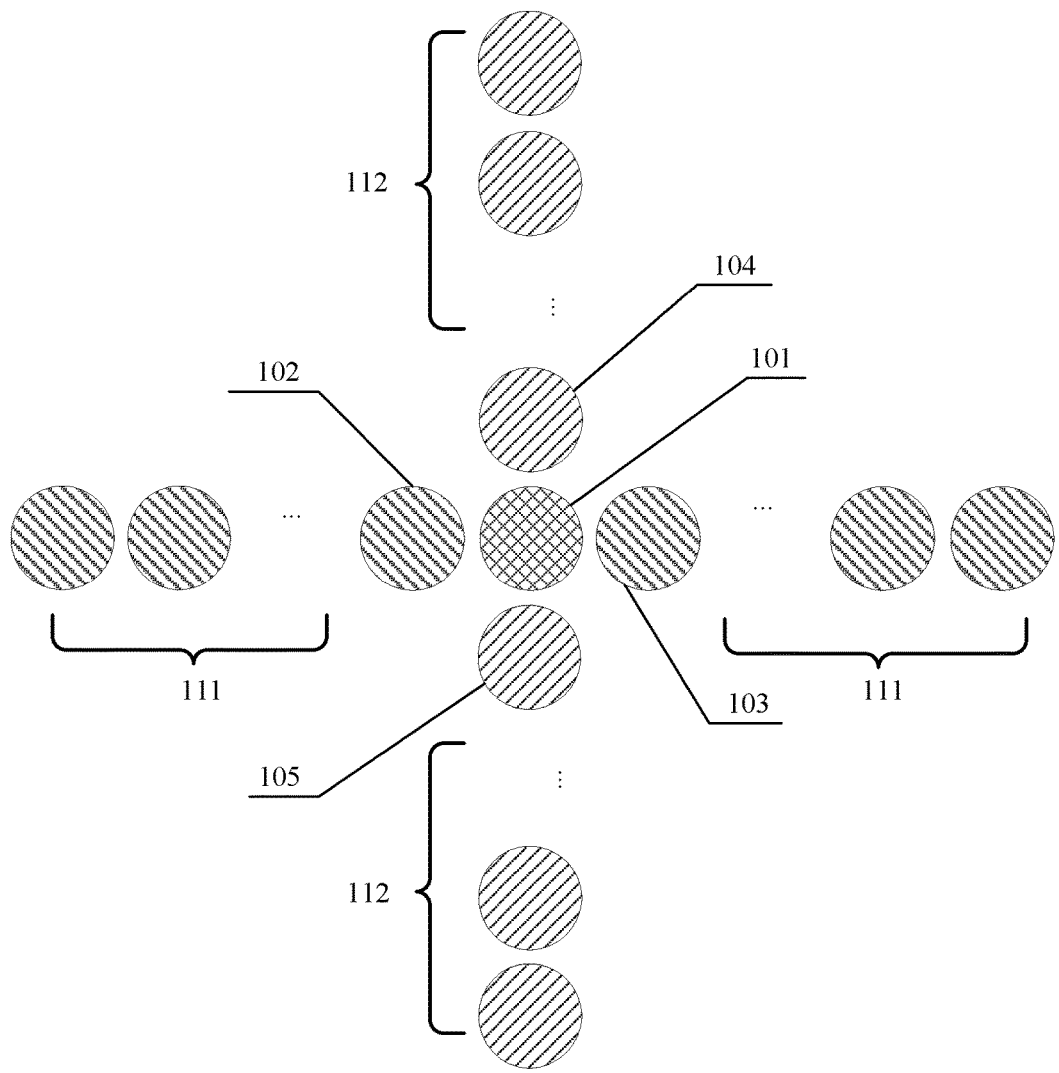
FIG. 5 is a diagram of a location relationship among phase centers of antenna units in an antenna according to an embodiment of the present invention.

Preferably, multiple receive auxiliary antenna units 111 and multiple transmit auxiliary antenna units 112 may be further added to the antenna structures shown in FIG. 2 and FIG. 3. As shown in FIG. 4 and FIG. 5, phase centers of the receive auxiliary antenna units 111 are located on an extended line of a connection line between the respective phase centers of the two receive antenna units, and each two of the phase centers of the receive auxiliary antenna units 111 are symmetric with respect to the phase center of the transmit and receive antenna unit 101, and the receive auxiliary antenna units 111 are all connected to the signal output port 110 by using the power combiner 108; and phase centers of the transmit auxiliary antenna units 112 are located on an extended line of a connection line between the respective phase centers of the two transmit antenna units, and each two of the phase centers of the transmit auxiliary antenna units 112 are symmetric with respect to the phase center of the transmit and receive antenna unit 101, and the transmit auxiliary antenna units 112 are all connected to the signal input port 109 by using the power divider 107.

The receive auxiliary antenna units 111 and the receive antenna units may be same antenna units, and the transmit auxiliary antenna units 112 and the transmit antenna units may be same antenna units. The power divider 107 may be set to perform equal-proportion allocation, so that transmit signal power of each transmit antenna unit, transmit signal power of each transmit auxiliary antenna unit 112, and transmit signal power of the transmit and receive antenna unit 101 are equal.

When locations of the antenna units are set, because the auxiliary antenna units are far away from a center of the antenna, interference caused by the transmit auxiliary antenna units 112 and interference with the receive auxiliary antenna units 111 may be ignored. Therefore, the location relationship among the receive antenna units, the transmit antenna units, and the transmit and receive antenna unit 101 can still be set according to the foregoing deduced and calculated results corresponding to FIG. 2 and FIG. 3. Introduction of the multiple receive auxiliary antenna units 111 and the multiple transmit auxiliary antenna unit 112 can further decrease a proportion of power of a transmit signal of the transmit and receive antenna unit 101 to total transmit power of the antenna, thereby further decreasing interference from a transmit signal of the antenna to a receive signal of the antenna.

Preferably, in the antenna structure shown in FIG. 2, $a_1=a_2=b_1=a$ may be set, that is, e is 60°, and lengths of a and b2 are set, so that interfering signals corresponding to $a_1$, $a_2$, and $b_1$ are superimposed (because $a_1$, $a_z$, and $b_1$ are equal, no phase differences exist among the interfering signals corresponding to $a_1$, $a_2$, and $b_1$, and the interfering signals can be superimposed with each other) and are cancelled by an interfering signal corresponding to b2. Specifically, it may be set that a difference between a and $b_2$ is an odd multiple of half of the operating wavelength of the antenna. In this way, a phase difference between corresponding interfering signals is 180°·(2n+1), (n=0, 1, 2, . . . ). Based on the foregoing settings, the following two relational expressions may be obtained:

$$b_2^2 = a_1^2 + a_2^2 - 2a_1 a_2 \cos(\pi - \theta)$$
$$= 2a^2(1 + \cos\theta) = 3a^2$$

and $$b_2 = a + (2n+1)\frac{\lambda}{2}, n = 0, 1, 2, \ldots .$$

With the two expressions, the following result may be obtained:

$$a = \frac{(\sqrt{3}+1)\cdot(2n+1)}{2} \cdot \frac{\lambda}{2}, n = 0, 1, 2, \ldots .$$

In this way, a and b2 that satisfy the foregoing relationship may be obtained.

In this embodiment of the present invention, an antenna includes at least one receive antenna unit, at least one transmit antenna unit, a transmit and receive antenna unit connected to a three-port component having a circulator characteristic, a signal output port, and a signal input port, where each receive antenna unit and a receiver port of the three-port component are both connected to the signal output port by using a power combiner, and the signal output port is configured to connect to a receiver; and each transmit antenna unit and a transmitter port of the three-port component are both connected to the signal input port by using a power divider, and the signal input port is configured to connect to a transmitter. In this way, by adjusting a distance between antenna units, different interferences from multiple transmit signals to multiple receive signals can be cancelled each other out in the power combiner, thereby decreasing interference from a transmit signal in a communications device to a receive signal in the communications device. In addition, a side lobe of the antenna can be further reduced.

Embodiment 3

Figure 6:
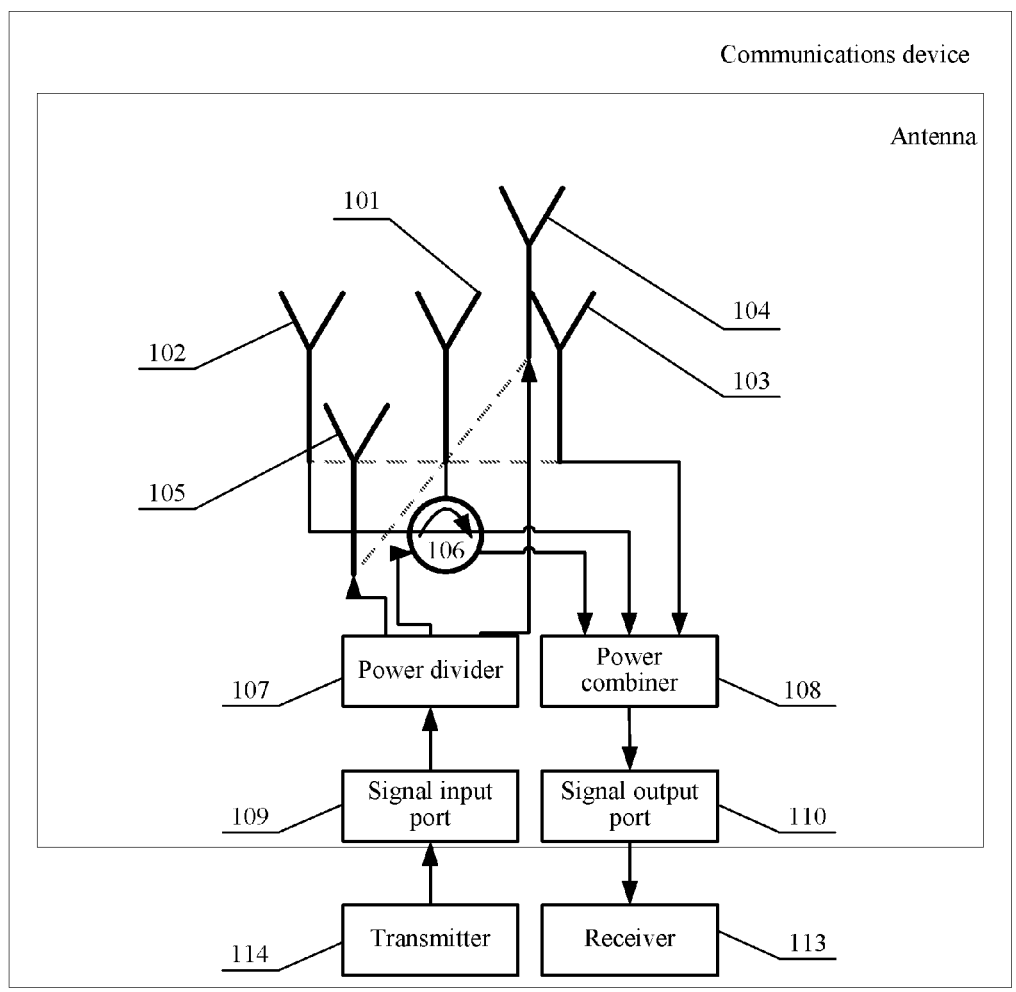
FIG. 6 is a schematic structural diagram of a communications device according to an embodiment of the present invention.

This embodiment of the present invention provides a communications device. As shown in FIG. 6, the communications device includes a receiver 113, a transmitter 114, and the antenna described in the foregoing embodiments. A signal output port 110 of the antenna is connected to the receiver 113, and a signal input port 109 of the antenna is connected to the transmitter 114.

A person of ordinary skill in the art may understand that all or some of the steps of the foregoing embodiments may be implemented by hardware or a program instructing related hardware. The program may be stored in a computer-readable storage medium. The foregoing storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:
1. An antenna, wherein the antenna comprises:
at least one receive antenna unit;
at least one transmit antenna unit;
a transmit and receive antenna unit connected to a three-port component having a circulator characteristic;
a signal output port; and
a signal input port, wherein
each of the at least one receive antenna unit and a receiver port of the three-port component are both connected to the signal output port by using a power combiner, and the signal output port is configured to connect to a receiver; and
each of the at least one transmit antenna unit and a transmitter port of the three-port component are both connected to the signal input port by using a power divider, and the signal input port is configured to connect to a transmitter, wherein a connection line set comprising a connection line between a phase center of each of the at least one transmit antenna unit and a phase center of each of the at least one receive antenna unit and a further connection line between a phase center of the transmit and receive antenna unit and a phase center of each of other antenna units, and a power allocation value of an interference source antenna unit that is in antenna units at two ends of each connection line in the connection line set and causes co-channel interference to an antenna unit at the other end satisfy the following condition:

there is at least one manner for dividing the connection line set into subsets, wherein all connection lines in the connection line set are divided into at least one pair of subsets, and in two subsets of each pair of subsets, a length difference between any two connection lines between the subsets is equal to an odd multiple of half of an operating wavelength of the antenna, a length difference between any two connection lines in a subset with more than one connection line is equal to an integer multiple of the operating wavelength of the antenna, and a sum of square roots of power allocation values of interference source antenna units corresponding to all connection lines in one subset is equal to a sum of square roots of power allocation values of interference source antenna units corresponding to all connection lines in the other subset.

2. The antenna according to claim 1, wherein the three-port component is a circulator.

3. The antenna according to claim 1, wherein the at least one receive antenna unit is an array comprising a single feed or multiple feeds, the at least one transmit antenna unit is an array comprising a single feed or multiple feeds, and the transmit and receive antenna unit is an array comprising a single feed or multiple feeds.

4. An antenna, comprising:
at least one receive antenna unit;
at least one transmit antenna unit;
a transmit and receive antenna unit connected to a three-port component having a circulator characteristic;
a signal output port; and
a signal input port, wherein
each of the at least one receive antenna unit and a receiver port of the three-port component are both connected to the signal output port by using a power combiner, and the signal output port is configured to connect to a receiver; and
each of the at least one transmit antenna unit and a transmitter port of the three-port component are both connected to the signal input port by using a power divider, and the signal input port is configured to connect to a transmitter, wherein in the at least one receive antenna unit and the at least one transmit antenna unit each of whose phase centers are away from a phase center of the transmit and receive antenna unit by a distance smaller than a preset distance, a connection line set comprising a connection line between a phase center of each of the at least one transmit antenna unit and a phase center of each of the at least one receive antenna unit and a connection line between the phase center of the transmit and receive antenna unit and a phase center of each of other antenna units, and a power allocation value of an interference source antenna unit that is in antenna units at two ends of each connection line in the connection line set and causes co-channel interference to an antenna unit at the other end satisfy the following condition:

there is at least one manner for dividing the connection line set into subsets, wherein all connection lines in the connection line set are divided into at least one pair of subsets, and in two subsets of each pair of subsets, a length difference between any two connection lines between the subsets is equal to an odd multiple of half of an operating wavelength of the antenna, a length difference between any two connection lines in a subset with more than one connection line is equal to an integer multiple of the operating wavelength of the antenna, and a sum of square roots of power allocation values of interference source antenna units corresponding to all connection lines in one subset is equal to a sum of square roots of power allocation values of interference source antenna units corresponding to all connection lines in the other subset.

5. The antenna according to claim 4, wherein a quantity of connection lines in each subset in the connection line set is 1; and power allocation values of all antenna units connected to the power divider are equal.

6. An antenna comprising:
at least one receive antenna unit;
at least one transmit antenna unit;
a transmit and receive antenna unit connected to a three-port component having a circulator characteristic;
a signal output port; and
a signal input port, wherein
each of the at least one receive antenna unit and a receiver port of the three-port component are both connected to the signal output port by using a power combiner, and the signal output port is configured to connect to a receiver; and
each of the at least one transmit antenna unit and a transmitter port of the three-port component are both connected to the signal input port by using a power divider, and the signal input port is configured to connect to a transmitter, wherein the at least one receive antenna unit is two receive antenna units, and the at least one transmit antenna unit is two transmit antenna units;
respective phase centers of the two receive antenna units are symmetric with respect to a phase center of the transmit and receive antenna unit; and
respective phase centers of the two transmit antenna units are symmetric with respect to the phase center of the transmit and receive antenna unit.

7. The antenna according to claim 6, wherein distances between the phase centers of both of the two receive antenna units and the phase centers of both of the two transmit antennas unit are equal.

8. The antenna according to claim 7, wherein a distance between the phase center of the transmit and receive antenna unit and the phase center of each receive antenna unit and a distance between the phase center of the transmit and receive antenna unit and the phase center of each transmit antenna unit are equal.

9. The antenna according to claim 6, further comprising multiple receive auxiliary antenna units and multiple transmit auxiliary antenna units, wherein
phase centers of the receive auxiliary antenna units are located on an extended line of a connection line between the respective phase centers of the two receive antenna units, and each two of the phase centers of the receive auxiliary antenna units are symmetric with respect to the phase center of the transmit and receive antenna unit; and the receive auxiliary antenna units are all connected to the signal output port by using the power combiner; and phase centers of the transmit auxiliary antenna unit are located on an extended line of a connection line between the respective phase centers of the two transmit antenna units, and each two of the phase centers of the transmit auxiliary antenna units are symmetric with respect to the phase center of the transmit and receive antenna unit; and the transmit auxiliary antenna units are all connected to the signal input port by using the power divider.

10. An antenna comprising:

at least one receive antenna unit;

at least one transmit antenna unit;

a transmit and receive antenna unit connected to a three-port component having a circulator characteristic;

a signal output port; and a signal input port, wherein each of the at least one receive antenna unit and a receiver port of the three-port component are both connected to the signal output port by using a power combiner, and the signal output port is configured to connect to a receiver; and each of the at least one transmit antenna unit and a transmitter port of the three-port component are both connected to the signal input port by using a power divider, and the signal input port is configured to connect to a transmitter, wherein the receive antenna unit is an array comprising a single feed or multiple feeds, the transmit antenna unit is an array comprising a single feed or multiple feeds, and the transmit and receive antenna unit is an array comprising a single feed or multiple feeds, and wherein the antenna is further disposed with a reflective surface; and a phase center of a receive antenna unit array comprising all receive antenna units and the transmit and receive antenna unit coincides with a phase center of a transmit antenna unit array comprising all transmit antenna units and the transmit and receive antenna unit, and coincides with a focus of the reflective surface.

* * * * *